Jan. 2, 1940.　　　　　T. E. ECKLER　　　　　2,185,787
AUTOMOBILE LICENSE PLATE HOLDER
Filed April 21, 1939　　　3 Sheets-Sheet 1
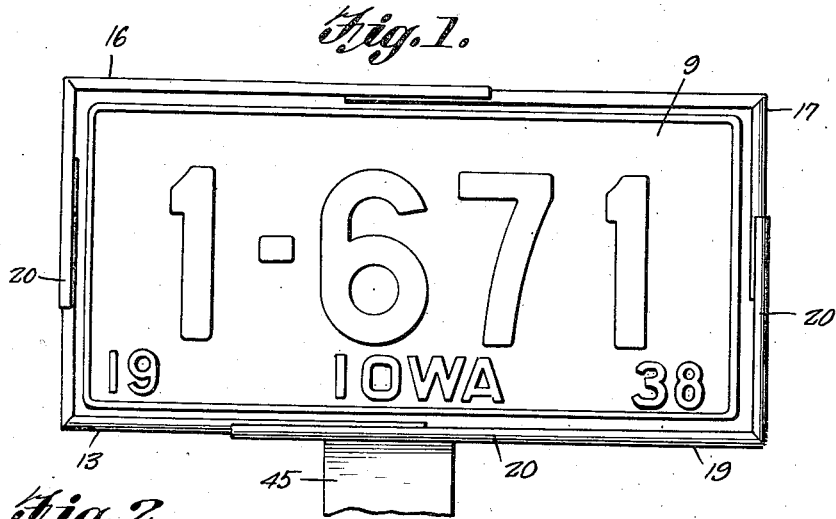
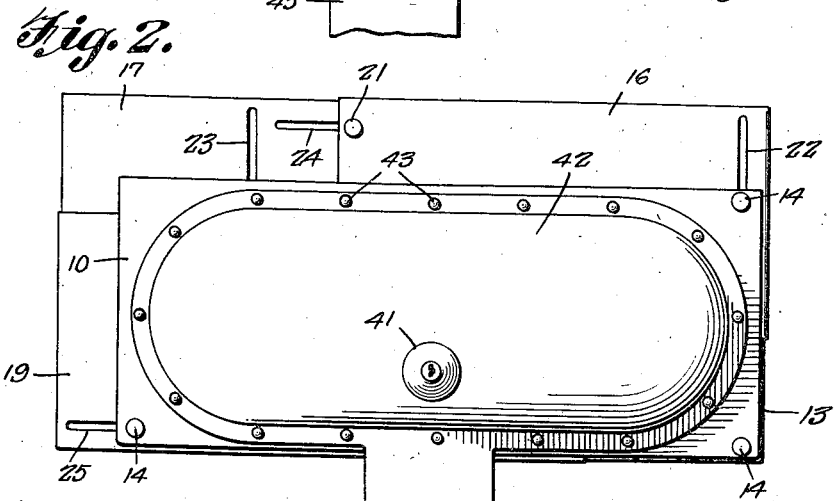
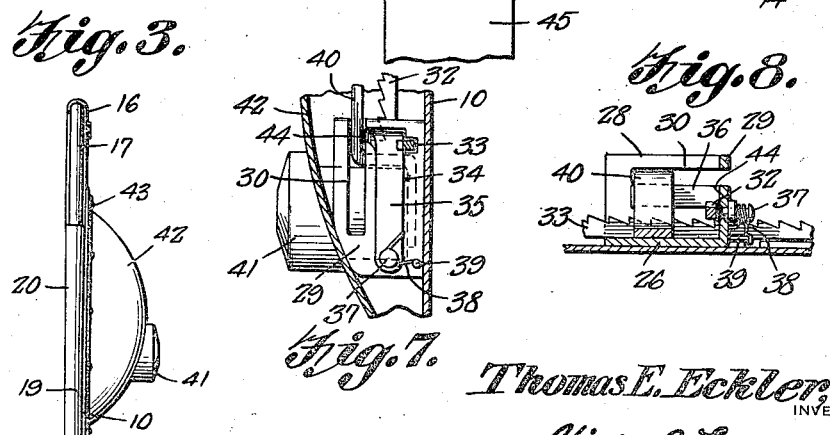
Thomas E. Eckler, INVENTOR
BY Victor J. Evans & Co.
ATTORNEYS

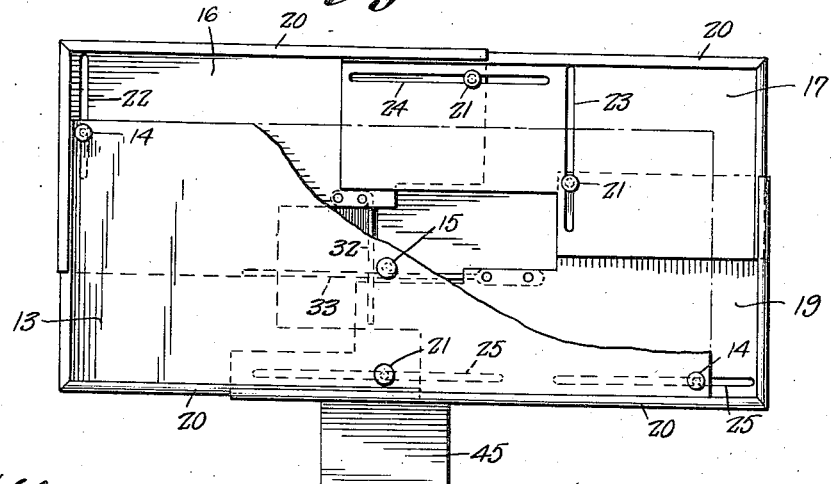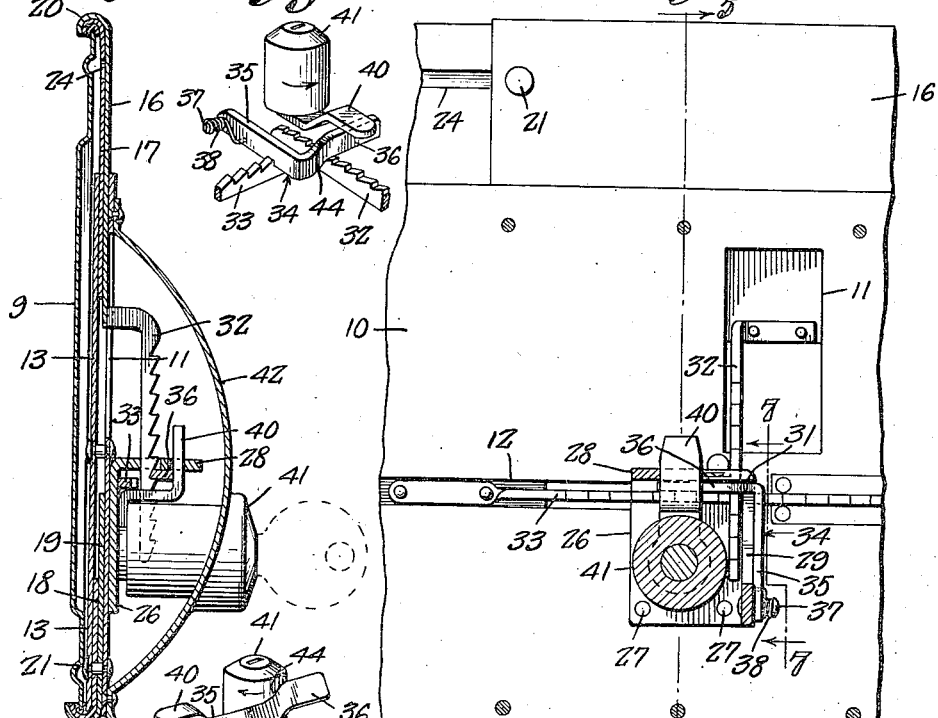

Jan. 2, 1940.  T. E. ECKLER  2,185,787
AUTOMOBILE LICENSE PLATE HOLDER
Filed April 21, 1939   3 Sheets-Sheet 3
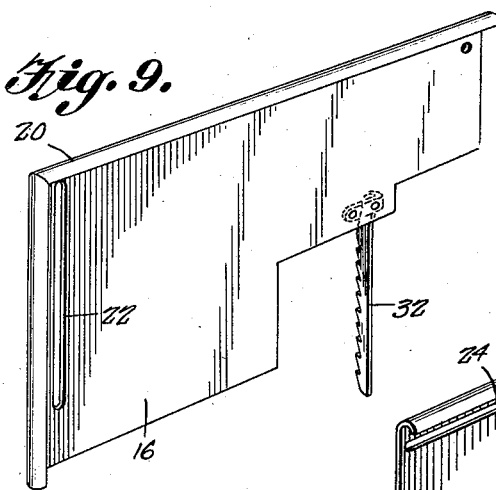
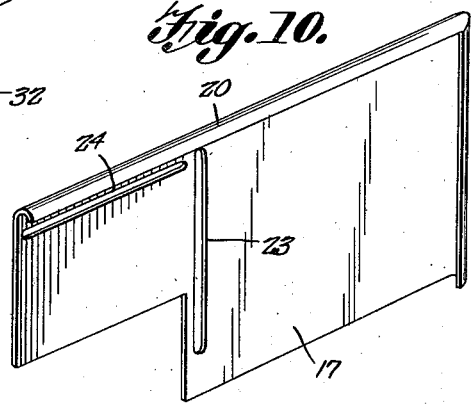
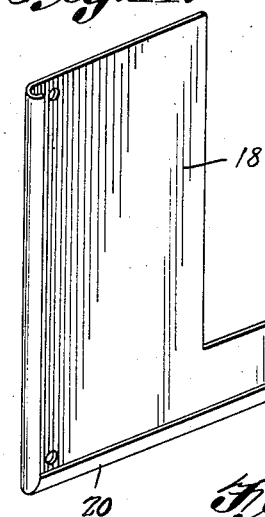
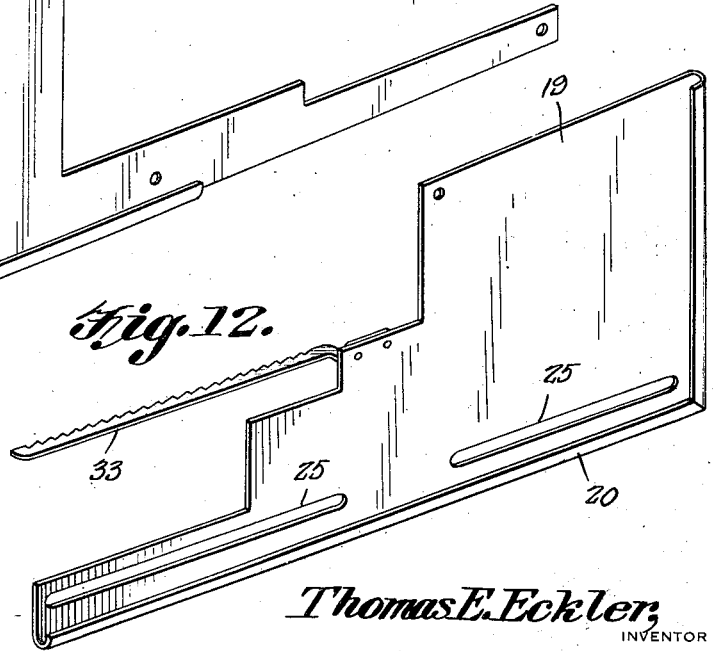
Thomas E. Eckler,
INVENTOR
BY Victor J. Evans & Co.
ATTORNEYS
P. W. Hickey.
WITNESS Patented Jan. 2, 1940

2,185,787

UNITED STATES PATENT OFFICE 2,185,787

AUTOMOBILE LICENSE PLATE HOLDER

Thomas E. Eckler, Fort Madison, Iowa, assignor of one-half to William Convey, Fort Madison, Iowa Application April 21, 1939, Serial No. 269,233

3 Claims. (Cl. 40—125)

This invention relates to automobile license plate holders and has for an object to provide a holder having locking mechanism for preventing surreptitious removal or changing of the license plate.

A further object of the invention is to provide a license plate holder which will be adjustable to receive various sizes of license plates.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a front elevation of a license plate holder constructed in accordance with the invention.

Figure 2 is a rear elevation of the license plate holder shown in Figure 1.

Figure 3 is an end elevation of the license plate holder with a portion broken away.

Figure 4 is a front elevation of the license plate holder with the license plate removed and with a portion broken away to expose the adjusting means.

Figure 5 is a cross sectional view of the holder taken on the line 5—5 of Figure 6 and showing the lock and notched arms held by the lock in locked position.

Figure 6 is a fragmentary rear elevation drawn to enlarged scale and with the rear cover plate removed to expose the intersecting locking arms and locking tongue of the lock mechanism.

Figure 7 is a detail cross sectional view taken on the line 7—7 of Figure 6.

Figure 8 is a detail cross sectional view taken on the line 8—8 of Figure 5 with parts removed and parts broken away.

Figure 9 is a perspective view of one of the upper adjustable plates of the holder.

Figure 10 is a perspective view of the other adjustable plate of the holder.

Figure 11 is a perspective view of one of the adjustable lower plates of the holder.

Figure 12 is a perspective view of the other adjustable lower plate of the holder.

Figure 13 is a detail perspective view showing the notched locking arms in locked position.

Figure 14 is a perspective view showing the notched locking arms in unlocked position.

Referring now to the drawings in which like characters of reference designate similar parts in the various views, the adjustable license plate holder comprises a lock casing having a back plate 10 of rectangular contour provided with a vertical slot 11 and a horizontal slot 12 best shown in Figure 6. A retaining plate 13, best shown in Figure 4, also of rectangular contour is arranged in advance of the back plate of the lock casing and is riveted at three of its corners and centrally between its ends to the back plate by rivets 14 and 15 respectively, as also shown in Figure 4.

A frame for the license plate is provided, comprising as shown in Figures 9 to 12 inclusive, a vertically movable frame section 16, a vertically and horizontally movable frame 17, a frame section 18 which is rigidly secured to the back plate and to the retaining plate, and a horizontally movable frame section 19. The sections are provided with flanges 20 at the outer edges for receiving the edge portions of a license plate 9, best shown in Figure 1.

The frame sections 16 to 19 inclusive are interposed between the back plate 10 of the lock casing and the retaining plate 13 thereof, as best shown in Figure 5. As previously stated the section 18 is fixed rigidly to the back plate and to the retaining plate by the rivets 14 and 15 by which the plates are connected. The other sections of the frame, namely, the sections 16, 17, and 19, are adjustably connected together by these rivets and rivets 21 carried by the frame sections. The frame section 16 is provided with a vertical slot 22, the frame section 17 with a vertical slot 23 and a horizontal slot 24, and the frame section 19 with spaced horizontal slots 25, through which the rivets 21 pass as best shown in Figure 4.

Secured to the back plate 10 of the casting as best shown in Figures 5, 6, 7 and 8 is a bracket comprising a vertical base 26 which is riveted as shown at 27 in Figure 5 to the back plate. A right angular flange having legs 28 and 29 is formed integral to the base, as also shown in Figures 7 and 8. One of the legs is provided with slots 30 and the other leg with a slot 31. Ratchet bars 32 and 33, secured to two of the frame sections, namely 16 and 19, pass respectively to the vertical slot 11 and horizontal slot 12 in the back plate 10 and through the slots 30 and 31 in the legs of the bracket. The ratchet bars are disposed at a right angle to each other, as best shown in Figures 5 and 6.

A dog 34, best shown in Figures 13 and 14 is provided with right angularly disposed legs 35 and 36 the former of which is pivotally connected to the flange 29 of the bracket through the medium of a pivot pin 37 best shown in Figures 6, 7 and 8. A helical spring 38 is sleeved on the pivot pin and is secured at one end to the bracket through the medium of a pin 39, the free end of the spring being engaged under the leg 35 of the dog. The free leg 36 of the dog is adapted to be engaged against the flange 28 of the bracket to hold both of the ratchet bars 32 and 33 in fixed relationship so that the sections of the sliding frame cannot be dislodged to permit removal of the license plate 9.

The dog 34 is normally held in the operative position shown in Figure 13 through the medium of a tongue 40 carried by a conventional lock 41 which is fixed to a cover plate 42, best shown in Figure 5, the cover plate being riveted as shown at 43 to the back plate 10. When the tongue is turned to engage the free leg 36 of the dog the dog is held in operative position but when the lock is unlocked the tongue is swung through a 90 degree arc to the position shown in Figure 14 and moved back over the pivot pin 37 of the dog. The dog is thus free to be moved by its controlling spring 38 to released position out of engagement with the crossed ratchet bars. It will be pointed out that the dog is provided with a cam surface 44 along which the tongue rides to permit the dog being lifted by its spring clear of the crossed ratchet bars.

When the lock tongue is in operative position as shown in Figures 13 and 16 the leg 36 of the dog 34 is held against the flange 28 of the bracket so that the ratchet bar of the frame section 16 cannot be dislodged from the dog. The pivoted leg 35 of the dog as also best shown in Figure 6 when the locking tongue is in operative position, is disposed against the flange 29 of the bracket and prevents the ratchet bar 33 of the frame section 19 being dislodged. Thus the frame sections are positively locked in place and cannot be removed until the operator inserts the key in the lock and turns the locking tongue in released position.

The cover plate 42 is provided with an integral arm 45 through the medium of which the device may be secured at the proper location on a motor vehicle.

Since the operation has been described as a description of the parts progressed it is thought that the invention will be fully understood without further explanation.

What is claimed is:

1. A license plate holder comprising spaced plates, a sectional license plate holding frame disposed between the plates, means for adjustably connecting the sections of the frame to each other, one of said plates being provided with slots, ratchet bars carried by two of the sections of the frame engaged through said slots and crossing each other at a right angle, a bracket carried by one of the plates, a pivoted dog carried by the bracket adapted to engage the ratchet bars for holding the ratchet bars against relative movement, and means for holding the dog in operative or in released position.

2. A license plate holder comprising a back plate provided with vertical and horizontal slots, a retaining plate, means securing the retaining plate to the back plate, a sectional frame for a license plate extensible horizontally and vertically, the frame being disposed between the back plate and the retaining plate, the sections of the frame being provided with slots slidably receiving said means, a bracket secured to the back plate, ratchet bars secured to the frame and passing through the slots in said plate and through slots formed in the bracket, said ratchet bars being disposed to extend across each other at a right angle, a pivoted dog carried by said bracket adapted to engage and hold both of the ratchet bars in locked position to prevent the sections of the frame being released from the license plate, and means for holding the dog in operative or released position.

3. A license plate holder comprising a back plate provided with vertical and horizontal slots, a retaining plate of elongated rectangular formation disposed contiguous to the back plate, rivets securing the retaining plate at three of its corners and centrally between its ends to said back plate, a sectional frame for a license plate, the sections of the frame being adjustable relatively to each other to vary the horizontal and vertical dimensions of the frame, the sections of the frame being interposed between the back plate and the retaining plate, one of the sections being rigidly fixed to the back plate and to the retaining plate by said rivets, the frame sections being provided with slots, said rivets passing through said slots, a bracket located between the back plate and retaining plate and secured to the back plate, ratchet bars secured to two of the sections of the frame and passing through the slots in said plate and through slots formed in the bracket, said ratchet bars being angularly related, an angular dog pivoted to the bracket and adapted to engage the ratchet bars and hold the frame in adjusted condition, a cover plate attached to the back plate, and a lock carried by the cover plate having a locking tongue adapted to engage the dog when the lock is turned to locked position and to hold the ratchet bars against movement to prevent said sections of the frame being disengaged from position upon a license plate.

THOMAS E. ECKLER.